United States Patent [19]
Speth et al.

[11] Patent Number: 5,578,674
[45] Date of Patent: Nov. 26, 1996

[54] HIGH-STRENGTH FILMS OF BLOCK COPOLYMER LATICES

[75] Inventors: David R. Speth, Midland, Mich.; Brian W. Walther, Baton Rouge, La.; Ronald R. Pelletier, Midland, Mich.

[73] Assignee: The Dow Chemical Company, Midland, Mich.

[21] Appl. No.: 469,184

[22] Filed: Jun. 5, 1995

Related U.S. Application Data

[63] Continuation-in-part of Ser. No. 170,625, Dec. 20, 1993, abandoned, which is a continuation-in-part of Ser. No. 2,433, Jan. 8, 1993, abandoned.

[51] Int. Cl.$^6$ ............... C08J 3/03; C08K 5/01; C08L 53/00; B29D 7/00

[52] U.S. Cl. ............ 524/575; 524/505; 524/556; 524/484; 524/487; 525/89; 525/99; 525/316; 523/335; 264/212

[58] Field of Search ................. 524/575, 505, 524/556, 484, 487; 525/89, 99, 316; 523/335; 264/212

[56] References Cited

U.S. PATENT DOCUMENTS

| | | | |
|---|---|---|---|
| 3,238,173 | 3/1966 | Bailey et al. | 260/29.7 |
| 3,360,599 | 12/1967 | Nyberg et al. | 260/880 |
| 3,719,572 | 3/1973 | Burke | 260/819 |
| 3,726,824 | 4/1973 | Saunders et al. | 260/29.7 |
| 4,199,490 | 4/1980 | Kamiya et al. | 524/505 |
| 4,358,403 | 11/1982 | Distler et al. | 524/745 |
| 4,386,125 | 5/1983 | Shiraki et al. | 525/314 |
| 4,898,914 | 2/1990 | Gergen et al. | 525/314 |
| 5,120,765 | 6/1992 | Southwick et al. | 524/556 |
| 5,141,986 | 8/1992 | Southwick et al. | 524/505 |
| 5,236,624 | 8/1993 | Lepert et al. | 252/314 |
| 5,336,712 | 8/1994 | Austgen, Jr. et al. | 524/530 |

FOREIGN PATENT DOCUMENTS

| | | |
|---|---|---|
| 0058952 | 9/1982 | European Pat. Off. |
| 0171225 | 12/1986 | European Pat. Off. |
| 224389A2 | 6/1987 | European Pat. Off. |
| 304124A2 | 2/1989 | European Pat. Off. |
| 541174A1 | 5/1993 | European Pat. Off. |
| 2015249 | 10/1970 | Germany |
| 9420574 | 9/1994 | WIPO |

OTHER PUBLICATIONS

Derwent No. 77–51183Y, Derwent Publications Ltd., London, GB.
*Block Polymers*, "Preceedings of the Symposium on Block Polymers at the Meeting of the American Chemical Society in New York City in Sep. 1969," Plenum Press, New York, 1970, pp. 79–103.
Chemical abstract CA77:89674H.

*Primary Examiner*—Paul R. Michl
*Assistant Examiner*—Olga Asinovsky
*Attorney, Agent, or Firm*—Norman L. Sims

[57] ABSTRACT

What is claimed is a coherent, elastomeric, solid, free-standing film comprising an organic phase comprising: (a) one or more block copolymer(s) corresponding to the formula:

$$A-B-X_m-(B-A)_n$$

wherein each A is a polymer block consisting essentially of a monovinylidene aromatic monomer, each B is a polymer block consisting essentially of a conjugated diene and, optionally, a monovinylidene aromatic monomer, X is the remnant of a multifunctional coupling agent, m is 0 or 1, and n is an integer from 1 to 5, each monovinylidene aromatic monomer block having a weight average molecular weight from about 8,000 to about 15,000 Daltons, each conjugated diene block having a weight average molecular weight from about 30,000 to about 200,000 Daltons, and (b) optionally, an extender which is compatible with the B block; wherein the A block comprises 5 to 25 percent by weight of the organic phase and exhibits an effective phase volume in the organic phase from about 5 to about 20 percent and the amount of extender present is sufficient to achieve the desired effective phase volume of the A block, wherein the film is annealed and demonstrates a tensile strength of 11.0 MPa or greater.

30 Claims, No Drawings

HIGH-STRENGTH FILMS OF BLOCK COPOLYMER LATICES

CROSS-REFERENCE TO RELATED APPLICATIONS

This application is a continuation-in-part of application Ser. No. 08/170,625, filed Dec. 20, 1993, now abandoned, which is a continuation-in-part application of application Ser. No. 08/002,433, filed Jan. 8, 1993, now abandoned (all incorporated herein by reference).

BACKGROUND OF THE INVENTION

The present invention relates to high-strength films prepared from aqueous dispersions of block copolymers of vinyl aromatic monomers and conjugated dienes.

Block copolymers of the conventional A—B—A type form strong films when cast from solutions in organic solvents. The use of aqueous dispersions or latices to form films or articles of intricate design is preferred to the use of casting from solutions because no objectionable fumes are released during the drying step. However, films of comparable thickness prepared by casting from their aqueous dispersions or latices are generally weak. To improve the strength of such films, U.S. Pat. No. 3,360,599 taught the use of an annealing procedure. Disadvantageously, this annealing procedure requires elevated temperatures and/or long annealing times. As a consequence, the resulting films often have inferior strength properties, due to polymer degradation, and/or the time required for film formation is unacceptably long. U.S. Pat. No. 4,199,490 taught the addition of a second aqueous dispersion comprising a rubber, synthetic resin or a mixture thereof to enable the formation of films upon drying at room temperature. In the absence of such additive, the block copolymer dispersion did not possess adequate film-forming properties at moderate or low temperatures. In U.S. Pat. No. 3,238,173, there was disclosed the preparation of concentrated aqueous dispersions by contacting the dilute latex with an aliphatic hydrocarbon that is a non-solvent for the non-elastomeric block, removing the hydrocarbon and concentrating the latex. The use of such non-solvents is undesirable, due to the added complexity of the process and the presence of residual organic contaminants in the resulting films.

Accordingly, there remains a need to provide films prepared from aqueous dispersions of block copolymers having improved strength properties. In addition, it would be desirable to provide a process capable of preparing strong films from aqueous latices of block copolymers that uses relatively short times and mild temperature conditions for the annealing step to thereby avoid significant polymer degradation. Finally, it would be desirable to provide a process for the preparation of thin elastomeric articles by film deposition from a block copolymer latex that avoids the use of additives.

Many thin elastomeric articles are prepared using coagulation dipping techniques. It is desirable to prepare films from latices of aqueous dispersions of block copolymers using coagulation dipping techniques. What is needed are stable aqueous dispersions of block copolymers which form good films by coagulation wherein the films anneal rapidly at moderate temperatures and demonstrate high tensile strengths.

For many uses, thin elastomeric films must demonstrate resistance to degradation by ozone. What is needed are stable aqueous dispersions of block copolymers which form ozone-resistant films, and such ozone-resistant films.

SUMMARY OF THE INVENTION

Accordingly, the present invention comprises an aqueous dispersion which is capable of forming a free-standing, coherent, elastomeric, solid film which, after drying and annealing at 80° C. for 30 minutes, demonstrates a tensile strength of about 11.0 MPa or greater wherein the dispersion comprises:

I. an organic phase comprising;
   (a) one or more block copolymer(s) corresponding to the formula

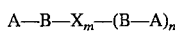

wherein each A is a polymer block consisting essentially of a monovinylidene aromatic monomer, each B is a polymer block consisting essentially of a conjugated diene and, optionally, a monovinylidene aromatic monomer, X is the remnant of a multifunctional coupling agent, m is 0 or 1, and n is an integer from 1 to 5, each monovinylidene aromatic monomer block, A, having a weight average molecular weight from about 8,000 to about 15,000 Daltons, each conjugated diene block, B, having a weight average molecular weight from about 30,000 to about 200,000 Daltons, and
   (b) optionally, an extender for the block copolymer which is compatible with the B block;

II. a surfactant in sufficient amount to emulsify the organic phase in water and such that a film formed from the dispersion exhibits the required properties; and III. water, wherein the average A block content of the organic phase is from about 5 to about 25 percent by weight and the A block effective phase volume in the organic phase is from about 5 to about 20 percent, wherein the amount of extender present is sufficient to achieve the desired effective phase volume of the A block and the required film properties.

In another embodiment, the invention comprises a high-strength, free-standing film comprising the block copolymer described above, optionally, the extender described hereinbefore and a residual amount of the surfactant described hereinbefore, wherein the film exhibits a tensile strength at break of about 11.0 MPa or greater after annealing at 80° C. for 30 minutes.

In yet another embodiment, the invention comprises a process for preparing a film which comprises (1) forming an aqueous dispersion from the block copolymer, water, extender and surfactant as described hereinbefore, (2) depositing a layer of the aqueous dispersion on a surface to form a film, (3) removing the film from the surface, and (4) annealing the film under conditions such that the film exhibits tensile strength at break of about 11.0 MPa or greater after annealing at 80° C. for 30 minutes. The invention also comprises films prepared by the process described.

Surprisingly, such block copolymers readily form thin films by deposition onto solid surfaces from an aqueous dispersion. Such films may be dried to form coherent, elastomeric, solid film articles having high annealed strength properties using short annealing times and mild annealing temperatures. Examples of such articles include surgical gloves, examination gloves, condoms, catheters, balloons and other thin elastomeric articles. If a tackifier and, optionally, other formulants known to one skilled in the art are combined with the block copolymer, films having adhesive properties may also be prepared. Such films may be deposited onto a thin, flexible substrate for use as pressure sensitive tapes, packaging tapes, masking tapes, labels, etc.

DETAILED DESCRIPTION OF THE INVENTION

It has been discovered that by careful selection of the block copolymer and the total volume of the polystyrene phase, stable aqueous dispersions can be prepared which form strong free-standing films upon drying at relatively low temperatures. In selecting appropriate block copolymers, the weight average molecular weight of the monovinylidene aromatic monomer block must be within the limits defined herein. If the chain length is too high, the annealing time required to form a high-strength film becomes unacceptably long. If the endblock length is too low, the films prepared do not exhibit acceptable tensile strengths. The total volume of the monovinylidene aromatic monomer (block A) in the organic phase is important in that, if the volume of the monovinylidene aromatic monomer phase is too high, stable dispersions cannot be formed using a relatively low amount of surfactants. If the A block phase volume is too low, the films prepared from the block copolymers will not exhibit the required tensile strengths.

Both linear and radial block copolymers are suitably employed in the invention. Most preferably, however, the block copolymers are triblock copolymers, i.e., n in Formula (I) is equal to 1.

The block copolymers may be partially tapered, fully tapered or untapered polymers. By the term "tapered" is meant that the B block changes gradually from diene-rich or pure diene homopolymer in the center to include increasing proportions of monovinylidene aromatic monomer in a gradual conversion towards the junction of the monovinylidene aromatic block of the block copolymer and terminates in pure homopolymer of the monovinylidene aromatic monomer (the A block). The conversion may be symmetrical or unsymmetrical with respect to the center of the B block. Triblock copolymers possessing taperedness at only one junction are referred to as "half-tapered" polymers.

Preferable monovinylidene aromatic monomers for use herein include styrene and alkyl-substituted derivatives of styrene. Examples include styrene, α-methylstyrene, vinyl toluene, etc. A more preferred monovinylidene aromatic monomer is styrene. Conjugated dienes suitably employed in the present invention include 1,3-butadiene, isoprene or mixtures thereof. Preferably, the conjugated diene is isoprene. Preferably, the amount of monovinylidene aromatic monomer in the organic phase is about 5 percent by weight or greater and more preferably, about 10 percent by weight or greater. Preferably, the amount of monovinylidene aromatic monomer in the organic phase is about 25 percent by weight or less and about 20 percent by weight or less. Preferably, the monovinylidene aromatic monomer block has a weight average molecular weight of about 5,000 Daltons or more and more preferably, 8,000 Daltons or more. Preferably, the monovinylidene aromatic monomer block has a weight average molecular weight of about 20,000 Daltons or less and more preferably, 15,000 Daltons or less. Preferably, each conjugated diene block (B) has a weight average molecular weight of about 30,000 Daltons or greater, more preferably, 40,000 Daltons or greater and most preferably, 50,000 Daltons or greater. Preferably, each conjugated diene block has a weight average molecular weight of 240,000 Daltons or less, more preferably, 200,000 Daltons or less, even more preferably, 120,000 Daltons or less and most preferably, 100,000 Daltons or less. Preferably, the monovinylidene aromatic polymer block has an effective phase volume in the organic phase of about 5 volume percent or greater, more preferably, 10 volume percent or greater, and even more preferably, 12 volume percent or greater. Preferably, the monovinylidene aromatic polymer block has an effective phase volume in the organic phase of about 20 volume percent or less, more preferably, 19 volume percent or less, even more preferably, 18.5 volume percent or less and most preferably, 18 volume percent or less. "Organic phase" as used herein-refers to all of the organic-based materials in the dispersion, except the surfactant. Such materials include the block copolymers and any optional extender.

A blend of two or more block copolymers may be used in this invention. All of the block copolymers used preferably have A blocks which have weight average molecular weights in the range of from about 8,000 to about 15,000 Daltons. The composition weighted average styrene content of the blended copolymers is preferably from about 5 to about 25 percent by weight. One or more of the components may have a styrene content outside of the stated range, provided the average is within the stated range. In the embodiment wherein one of the block copolymers in such a blend has a styrene content above 25 weight percent, it is preferred that the styrene content be about 35 weight percent or less and, more preferably, about 30 weight percent or less. Preferably, the total amount of block copolymer having a styrene content above about 25 percent by weight is about 35 percent by weight or less and, more preferably, about 30 percent by weight or less. The block copolymers can be blended in bulk and thereafter emulsified. Optionally, the block copolymers may be emulsified separately and the dispersions can be blended. Methods of blending the bulk block copolymers or aqueous dispersions of the block copolymers are well known in the art.

In some embodiments of the invention, the one or more block copolymers may have an effective phase volume of the A block which is greater than preferred. In order to reduce the phase volume of the A block, an extender may be blended with the block copolymer to reduce the effective phase volume of the A block in the organic phase to the required or desired level. Extenders useful in the invention are non-volatile organic materials which are compatible with the B block, that is, such extenders are soluble in the B block or form a single phase with the B block when the extender is mixed with one or more block copolymers. Further, useful extenders do not degrade the properties of the films prepared from the aqueous dispersions of the invention such that the tensile strengths are less than 11.0 MPa when the films are annealed at 80° C. for 30 minutes. Among preferred extenders are hydrocarbon oils, polymers or oligomers derived from monomers having olefinic unsaturation compatible with the B block, or mixtures thereof. More preferred extenders are the aliphatic hydrocarbon and naphthenic oils, with the most preferred class of extender oils being the aliphatic hydrocarbon oils. The preferred hydrocarbon oils are selected according to the ultimate end use and the cost of such oils. Among preferred oils are Tufflo™ 6056 mineral oil (trademark of Atlantic Richfield Company) and Shellflex™ 371 mineral oil (trademark of Shell Oil Company). The preferred polymers useful as extenders include polyisoprene, polybutadiene, polyisobutylene, polyoctene, polyethylene vinyl acetate, polyethylene methacrylate, ethylenepropylene diene monomer-based polymers, styrenebutadiene random copolymers and ethylene-styrene copolymers. Most preferred polymers include polyisoprene and polybutadiene. The extenders are present in sufficient amount to achieve the desired effective phase volume of the A block. If too much extender is used, the films prepared from the aqueous dispersions would not meet the tensile strengths required. The amount of extender is preferably about 45 percent by weight or less of the organic phase, more preferably, about 40 percent by weight or less and most preferably, about 30 percent by weight or less. If present, the extender is present in an amount of about 1 percent by weight or greater of the organic phase and more preferably, 5 percent by weight or greater.

The extender oils can be blended with the block copolymer in bulk and the blend can be emulsified. Alternatively, the extender oils and block copolymers can be separately emulsified and the dispersions can be blended to achieve the desired organic phase composition. In yet another embodiment, the extender may be added directly to a dispersion of the block copolymers. Methods of performing such blending are well known in the art. In the embodiment where the extender is a polymer, the polymer is either blended into a solution of block copolymer in organic solvent or into a dispersion of the block copolymer. Preferably, the extender is in the form of an organic solution or dispersion when blended with the block copolymer.

To achieve the required organic phase composition, a blend of two or more copolymers and one or more extenders may be used in combination.

Effective phase volume or volume percent of the monovinylidene aromatic monomer blocks may be less than the weight percent of monovinylidene aromatic monomers in such copolymers. Especially if one or more of the polymers is tapered, the monovinylidene aromatic monomer blocks are more compatible and, therefore, more soluble in the diene polymer phase of the resulting multiple phase structure compared to pure monovinylidene aromatic homopolymer blocks. Due to such solubility, the volume of the phase segregated monovinylidene aromatic polymer is less than the content of such monovinylidene aromatic monomer expressed by weight. Accordingly, the percentage of the monovinylidene aromatic monomer block in the block copolymer or organic phase, measured as a volume percent, is less than the percentage thereof measured by weight. In order to determine the volume percent of the monovinylidene aromatic polymer block, the corresponding weight percentage of monovinylidene aromatic monomer is divided by a correction factor. The correction factor is a value equal to the sum of ratios of each monomer's content in weight percent divided by the respective density of a homopolymer of such monomer. For a two-component block copolymer, this may be expressed as follows:

$$\% \ (vol_a) = \% \ (wt_a)/D_a/(\% \ (wt_a)/D_a + \% \ (wt_b)/D_b) \quad (II)$$

where:

%  ($vol_a$) is the effective phase volume in percent for the monovinylidene aromatic polymer block;

%  ($wt_a$) and %  ($wt_b$) are the respective weight percent contents of monovinylidene aromatic monomer and diene monomer in the block copolymer; and $D_a$ and $D_b$ are the respective densities of homopolymers, the monovinylidene aromatic monomer and diene monomer.

In those embodiments where an extender is present, the effective phase volume of the A block in the organic phase is represented by Formula III:

$$\% \ (vol_a) = \% \ (wt_a)/D_a/(\% \ (wt_a)/D_a + \% \ (wt_b)/D_b + \% \ (wt_d)/D_d) \quad (III)$$

where:

%  ($wt_d$) is the weight percent extender present, and $D_d$ is the density of the extender present.

For tapered block copolymers, the above numerator is further multiplied by a correction factor equal to 1−τ (where τ is the degree of taperedness) to account for the isolated monovinylidene aromatic polymer content. The degree of taperedness in the block copolymer is the percentage of total monovinylidene aromatic monomer units that are isolated. Such isolated monovinylidene aromatic monomer units are those segments of monovinylidene aromatic monomer or oligomer units surrounded on both sides by conjugated diene monomer units and are easily determined by the use of nuclear magnetic resonance spectroscopy as disclosed in Mochel, *Rubber Chemistry and Technology*, Vol, 40, p. 1200, 1967. Because such isolated monomer or oligomer units do not contribute significantly to the phase represented by the monovinylidene aromatic polymer block, tapered block copolymers possess an effective monovinylidene aromatic polymer phase volume that is significantly less than the weight percent monovinylidene aromatic monomer content.

At lower monovinylidene aromatic monomer effective phase volumes, especially for polymers wherein the monovinylidene aromatic monomer block molecular weight is relatively low, the tensile properties of the resulting films are unacceptably low. At higher monovinylidene aromatic monomer effective phase volumes, the dispersion does not readily form films, especially at mild temperatures from about 25° C. to about 90° C. Moreover, films from such polymers require longer periods of time under annealing conditions and/or higher annealing temperatures to achieve maximum tensile strength properties. Such films are subject to polymer degradation resulting in films possessing poor tensile properties, especially ultimate tensile strength.

Preferably, the weight average molecular weight ($M_w$) of the triblock block copolymers is about 60,000 Daltons or greater, more preferably, about 76,000 Daltons or greater and most preferably, about 96,000 Daltons or greater. Preferably, the weight average molecular weight ($M_w$) of the triblock block copolymers is 430,000 Daltons or less, more preferably, about 240,000 Daltons or less and most preferably, 200,000 Daltons or less. In the embodiment where the block copolymer is a radial block copolymer, the weight average molecular weight is preferably about 110,000 Daltons or more. In the embodiment where the block copolymer is a radial block copolymer, the weight average molecular weight is preferably about 500,000 Daltons or less, more preferably, 400,000 Daltons or less and most preferably, 300,000 Daltons or less. Molecular weights are determined by size-exclusion chromatography. Commercially available polystyrene standards are used for calibration and the molecular weights of copolymers corrected according to Runyon et al., *J. Applied Polymer Science*, Vol. 13, p. 2359, 1969, and Tung, L. H., *J. Applied Polymer Science*, Vol. 24, p. 953, 1979.

Preferably, the B block of the block copolymers employed herein comprises a high 1,4-content polymer of a conjugated diene. By this is meant that the vinyl functionality of the resulting conjugated diene polymer block is preferably below about 10 weight percent for blocks not containing butadiene or, in the case of blocks comprising butadiene, preferably below about 25 weight percent.

It is believed (but not agreeing to be bound by such belief) that when the monovinylidene aromatic polymer blocks possess the previously stated effective phase volume, the monovinylidene aromatic polymer blocks coalesce, thereby causing the polymer matrix to possess a particulated or spherical morphology instead of a cylindrical or lamellar morphology. Such morphology is desirable for the formation of films from dispersions having good strength properties and film formation rates. Such morphology, as well as the concept of polymer block phase volume, are disclosed in S. L. Aggarwal, *Block Pollers*, Plenum Press, pp. 102–103, 1970. It is further believed (but not agreeing to be bound by such belief) that the particulated or spherical morphology which is present in the A block is the discontinuous phase which facilitates the formation of stable dispersions and strong films.

Block copolymers and techniques for their preparation are well known in the art. Such polymers may be prepared by sequential anionic polymerization utilizing alkyllithium initiators, such as n-butyllithium, sec-butyllithium, etc. They may also be prepared by coupling of living block copolymers or by using soluble difunctional lithium initiators such as 1,3-phenylene-bis(3-methyl-1-phenylpentylidene)-bis-(lithium), or a similar initiator as disclosed in U.S. Pat. No. 4,196,154, the teachings of which are incorporated herein by reference. The block copolymers may be tapered or untapered. That is, the junction between the separate blocks may be gradual or abrupt. Untapered block copolymers may be formed by completely polymerizing each monomer component before adding the next block-forming monomer to the reaction medium containing the living polymer anion. Tapered block copolymers may be formed by copolymerizing a mixture of the monomers using the previously mentioned difunctional initiators. Due to the differing reactivities of the monomers, a relatively pure diene block initially forms, followed by an intermediate portion of such polymer containing increasing amounts of interspersed monovinylidene aromatic monomer or oligomers and, finally, a relatively pure monovinylidene aromatic polymer block.

After polymerization according to one of the foregoing anionic polymerization techniques, the living polymer anion is terminated by addition of a terminating agent containing a reactive hydrogen, or coupled by a coupling agent containing multiple leaving groups. Suitable terminating agents include water, alcohols and carboxylic acids. Suitable coupling agents include ethylene dibromide, methylene chloride, carbon tetrachloride, silicon tetrachloride and dichlorodimethylsilane. Additional additives can be added to the reaction mixture before or after the polymerization is completed for purposes of stabilizing the polymer, preventing discoloration or for any other suitable purpose. The polymerization is normally conducted in an organic solvent such as hexane, toluene, cyclohexane, benzene or a mixture thereof.

Surfactants useful in the invention are those which emulsify the block copolymer(s) and optional extender in water. Anionic, cationic and nonionic surfactants may be used, with the anionic and cationic surfactants being preferred. Even more preferred surfactants are the $C_{12-30}$ saturated and unsaturated carboxylic acids or salts thereof, sulfated alkylphenoxypoly(ethyleneoxy)ethanol alkali or ammonium salts and dialkyl esters of alkali metal sulfosuccinic acid (for example Aerosol™ OT dioctyl ester of sodium sulfosuccinic acid, available from American Cyanamid). Even more preferred are the $C_{12-30}$ saturated and unsaturated carboxylic acids or salts thereof. Preferred counterions are the alkali metals and ammonium ions. Among the most preferred surfactants are isostearic acid, linoleic acid, linolenic acid, lauric acid, oleic acid (for example, Industrene™ 105 oleic acid, available from Humko Chemical), alkali metal salts of disproportionated rosin (for example, Dresinate™ 214 potassium salt of disproportionated rosin, predominantly abietic acid). Preferably, the surfactants have an HLB of about 15 or greater and, more preferably, an HLB of about 18 or greater.

The surfactant is present in a sufficient amount to emulsify the block copolymer(s) and optional extender(s). If too much surfactant is used to prepare the aqueous dispersions, films prepared from the aqueous dispersions will not demonstrate the desired tensile properties. The reason is that a significant amount of the surfactant will remain in the film which is formed from the aqueous dispersion. The maximum amount of surfactant useful is related to how much surfactant is retained in the film. More than this amount may be used if the excess portion is removed prior to film formation or can be leached from the film prior to annealing. Preferably, about 0.5 percent by weight or more of surfactant is present and more preferably, 1 percent by weight or more is present. Preferably, about 10 percent by weight or less surfactant is used, more preferably, about 8 percent by weight is used and even more preferably, about 6 percent by weight or less is used. Where a portion of the surfactant is removed prior to film formation, up to about 20 percent by weight may be used, provided no more than about 10 percent by weight is present in the final film.

To produce an aqueous dispersion (interchangeably referred to herein as a dispersion or a latex) the polymer, usually in the form of a solution in an organic solvent, is dispersed in water using a suitable surfactant and the organic solvent is removed. One suitable procedure is previously disclosed in U.S. Pat. No. 3,238,173 (incorporated herein by reference). Emulsification can take place by any of the well-known means for this purpose and the specific means utilized does not form an essential aspect of the present invention. In one embodiment, the block copolymer and optional extender are dissolved in an organic solvent. In such embodiment, a portion of the solvent is removed until the solids level is preferably about 30 percent by weight or greater and, more preferably, about 40 percent by weight or greater. Preferably, the solids content is as high as possible. The upper limit is a practical one, in that the solution must be processable. Preferably, the solids content is about 50 percent by weight or less. Thereafter, the block copolymer and optional extender are contacted with water and surfactant with agitation to emulsify the mixture. Thereafter, the remaining solvent is removed by conventional means, such as rotary evaporation or vacuum distillation. Preferably, the solids level is about 20 percent by weight or greater and more preferably, about 28 percent by weight or greater. Preferably, the solids level is about 75 percent by weight or less, more preferably, about 70 percent by weight or less, even more preferably, 65 percent by weight or less and most preferably, 60 percent by weight or less. Generally, the number average size of the resulting latex particles is less than about 5.0 µM, more preferably, from about 0.3 to about 2.0 µM. Preferably, the latex particles (the dispersed polisher particles in the aqueous medium) are spherical in shape.

To prepare a film from the dispersion, a suitable form having a surface in the shape of the desired resulting product (optionally having a surface coating of a suitable substance to promote film removal and/or dispersion deposition as previously known in the art) is coated with the dispersion and the water thereafter removed by evaporation. A preferred dispersion for use in the manufacture of dipped goods in the foregoing manner contains about 20 percent by weight or greater of solids, more preferably from about 25 percent by weight or greater and 27 percent by weight or greater. Preferably, the dispersion has a solid content of about 70 weight percent or less, more preferably, about 60 weight percent or less and most preferably, 55 percent by weight or less. A second or further layer may be applied in the same manner to achieve thicker films. The film resulting from the foregoing procedure may be dried and annealed, if desired, by any suitable technique, especially by heating. Preferable temperatures for drying and annealing are about 25° C. or greater, preferably, about 30° C. or greater and most preferably, about 50° C. or greater. Preferably, the temperatures for drying and annealing the films are about 130° C. or less, more preferably, from to about 120° C. or less and most preferably, about 90° C. or less. Preferable times for drying and annealing are about 1 minute or greater and more preferably, about 4 minutes or greater. Preferable times for drying and annealing are about 10 hours or less preferably, about 60 minutes or less and more preferably, 30 minutes or less. At higher temperatures, shorter drying and annealing times are required. The drying and annealing steps of the process may be conducted simultaneously or separately. For example, multiple film layers may be deposited and dried before the resulting structure is annealed.

Preferably, the films are prepared by coagulation dipping techniques. Such techniques are well known in the art, see for example, Gazeley et. al., "Technological Processing of Natural Rubber Latex," *Natural Rubber Science and Technology*, Chapter 4 (Ed. Roberts), Oxford University Press (1988) and Mausser, *The Vanderbilt Latex Handbook*, 3d. Ed., pp. 197–206, R. T. Vanderbilt Co., Inc. (1987), relevant parts incorporated herein by reference. In order to facilitate the preparation of a dispersion which forms an acceptable film by coagulation, the surfactant must be carefully selected. The requirements for surfactants useful in coagulatable dispersions include: the ability to facilitate the formation of a stable dispersion, the formed dispersion must coagulate when exposed to divalent cations, such as calcium, the formed film must exhibit acceptable wet gel strength, upon drying the film must be continuous and the annealed film must meet the tensile strength requirements defined herein. Stable dispersions preferably exhibit the following characteristics: after 168 hours of storage any particles which cream are redispersible and the dispersion is homogeneous after redispersion, the particle size distribution (volume average) of the homogeneous dispersion is essentially equivalent (changes less than 10 percent) before and after storage and no visible sheen on the dispersion surface appears after storage. A coagulatable dispersion preferably produces a solid mass of material when an equal volume of dispersion and a 10 weight percent calcium nitrate solution are contacted and the liquid phase remaining after coagulation is relatively clear. "Wet gel" as used herein means the solid material formed when the dispersion is contacted with a solution containing a divalent cation salt. The wet gel preferably contains the same solids content as the dispersion from which it is formed. Wet gel strength can be measured according to the following test. A uniform coating of a divalent cation, such as calcium nitrate, is applied to a test form in sufficient amount to coagulate a wet gel film of the solids from the dispersion having a thickness of about 2 to about 20 mils (0.05 to 0.5 mm) thick. The form is preferably a glass jar of from about 2 inches (5.1 cm) to about 3 inches (7.6 cm) in diameter and at least about 2 inches (5.1 cm) high. Before the wet gel is dried, the form with the wet gel coated on it is submerged in a stationary water bath and drawn through it at a rate of about 25 to about 40 cm per second for a distance of at least 30 cm. This drawing is performed on each coated form at least four times. The coating exhibits acceptable wet gel strength if it remains intact with no delamination from the form during the test.

Preferred surfactants for use in coagulatable dispersions include salts of $C_{8-17}$ carboxylic acids having branching or cycloaliphatic moieties and unsaturation in the carbon chain, $C_{18-30}$ carboxylic acids having in its carbon chain one or more of unsaturation, branching or a cycloaliphatic moiety, and $C_{8-30}$ sulfosuccinic acid having a branched carbon chain, unsaturation in the carbon chain or a branched unsaturated carbon chain. More preferred coagulatable surfactants are salts of $C_{18-30}$ carboxylic acids having in its carbon chain one or more of cycloaliphatic moieties, unsaturation or branching and $C_{8-30}$ sulfosuccinic acids having a branched carbon chain, unsaturation in the carbon chain or a branched unsaturated carbon chain. Even more preferred coagulatable surfactants include salts of $C_{18-30}$ carboxylic acids having in its carbon chain one or more of unsaturation, branching or one or more cycloaliphatic moieties. Among most preferred coagulatable surfactants are oleic acid, abietic acid, isostearic acid, octadecanoic sulfosuccinic acid and ethylhexyl sulfosuccinic acid. The preferred counterion of the salts are alkali metal or ammonium cations, with the sodium and potassium cations being the preferred counterions. Such surfactants are used in the amounts described hereinbefore.

Preferably, the films or elastomeric articles of the invention contain an antiozonant which prevents or retards degradation due to ozone attack. Preferably, the films or elastomeric articles which contain an antiozonant do not stain and do not have an unpleasant odor. Preferable antiozonants include dialkyl paraphenylenediamines, acetals and styrene-substituted phenols. Preferred classes are the acetals and styrene substituted phenols. A preferred dialkyl paraphenylenediamine is N,N'-di-(2-octyl)p-phenylenediamine, available from R. T. Vanderbilt under the trademark Antozite™ 1. A preferred acetal is bis-(1,2,3,6-tetrahydrobenzaldehyde)-pentaerythrityl acetal available from Akrochem Corporation, under the trade name 70TBPA. A preferable styrene-substituted phenol is bis-(alphamethylbenzyl)phenol, available under the trade name PRODOX™ 120 from PMC Specialties Group. The antiozonants are used in a sufficient amount to render the films or articles of the invention ozone resistant for a period of 1000 hours. Ozone resistance is determined according to the following test. Films according to the invention are cut into dumbbell shapes having the following dimensions, 6.4 cm (length) by 1.3 cm (width) with a gauge dimension of 2.5 in. (6.4 cm) (length) by 0.5 in. (1.3 cm) (width). The samples are stretched to 100 percent elongation and secured to a hard surface at such elongation and exposed to atmospheric ozone. The time from the start of the test until the samples break is the ozone resistance. "Nonstaining" as used herein means transference of a noticeable color to white fiberboard during the ozone resistance test. Preferably, the antiozonant is present in an amount of 0.5 percent by weight or greater based on the article or film. Preferably, the antiozonant is present in an amount of 5 percent by weight or less based on the weight of the film or article. The antiozonant can be blended with the block copolymer or organic phase in bulk, in solution or in the dispersion using techniques well known in the art. Preferably, the antiozonant is dissolved in an organic solvent and contacted with a solution of the block copolymer or organic phase. Preferably, the same solvent is used for the antiozonant as the block copolymer or the organic phase. Preferably, the solids level of the antiozonant is the same as the solids level of the block copolymer or organic phase as this facilitates formation of a homogeneous mixture.

Preferably, the dispersions and films of the invention contain wax to further enhance the ozone resistance. Waxes useful in the films and dispersions of the invention include 1230 CP Hall No. Chek wax, Mobileer C wax from Mobil Oil Corporation. Wax is preferably present in an amount of 0.5 percent by weight or greater based on the solids in the dispersion or of the film, more preferably, 1.0 percent by weight or greater. Wax is preferably present in an amount of 5.0 percent by weight or less based on the solids in the dispersion or of the film, more preferably, 4.5 percent by weight or less.

The film thickness is determined by the ultimate use. The desired film thickness for the uses for which the films of the invention may be used are well known in the art. Preferably, the films have a thickness of about 0.03 mm or greater, more preferably, 0.13 mm or greater and most preferably, about 0.20 mm or greater. Preferably, the films are about 3.0 mm or less and, most preferably, about 0.30 mm or less. The films of this invention preferably exhibit a tensile strength at break of about 11.0 MPa or greater after annealing at 80° C. for about about 30 minutes. More preferably, the films exhibit a tensile strength of about 16.5 MPa or greater and, most preferably, about 22 MPa or greater, when annealed under such conditions.

Preferably, the films of this invention are free-standing, which means the films do not require a substrate to retain their integrity.

Films having adhesive properties may be prepared by incorporating a suitable tackifier, usually a low molecular weight organic polymer such as a polyterpene or similar compound, in the film. Tackifying resins useful herein are those known in the art and include hydrogenated rosin esters, esters of polyhydric alcohols, phenol-aldehyde resins and hydrocarbon resins, which includes polyterpenes. U.S. Pat. No. 5,183,705 provides a description of such tackifying resins, relevant portions are incorporated herein by reference. Additional formulants such as oils may also be added to modify the adhesive properties of the resulting film. Particularly useful oils are hydrocarbon oils, preferably paraffinic and naphthenic oils. U.S. Pat. No. 3,935,338 discloses preferred oils useful in adhesive formulations, relevant parts incorporated herein by reference. Such oils are preferably incorporated in amounts of 5 to about 20 percent by weight of the final adhesive formulation. The tackifiers and other formulants may be added to the polymer solution or incorporated into the latex. The resulting modified latex may be further concentrated and coated onto a substrate, for example, a sheet or a film, such as a masking tape backing. The substrate/film combination may thereafter be dried and, optionally, annealed to form the final product.

Having described the invention, the following examples are provided as further illustration and are not to be construed as limiting. Unless stated to the contrary, parts and percentages are expressed on a weight basis. Effective phase volumes were calculated using the previously disclosed Formulae (II and III). For such calculations, the densities of the respective polymers used were polystyrene: 1.047, polyisoprene: 0.904 and polybutadiene: 1.01.

EXAMPLE 1

Films of Styrene-Isoprene-Styrene Block Copolymer

An aqueous dispersion was formed from a cyclohexane solution of a styrene-isoprene-styrene triblock copolymer having a total $M_w$ of 136,000 Daltons, and a styrene content of 14 weight percent and 12 volume percent (effective phase volume). The surfactant used was Alipal™ CO-436 sulfated nonylphenoxypoly-(ethyleneoxy) ethanol at a 3 percent by weight level. Molecular weights were determined by gel permeation chromatography using polystyrene standards and corrected for diene content. The polystyrene endblocks had weight average molecular weights of 9500 Daltons. The total polyisoprene block $M_w$ was 115,000 Daltons. The solvent was removed and the dispersion concentrated to 54 percent solids by weight. Two-layer films were prepared by coating glass slides with the latex, drying the films at room temperature to remove water and repeating the process. The films were separated from the support and cut into test specimens. The films were translucent and had a thickness of about 0.25 mm. Specimens were tested without annealing and after annealing at 80° C. for the times identified in Table IA. Tensile strengths were evaluated according to ASTM-D-412-80. Samples were die-cut into dumbbell shapes having a gauge length of 25 mm and a width of 3 mm. Cross-head speed was 50 cm per minute. Results are contained in Table IA.

TABLE IA

Strength as a Function of Annealing Time

| Minutes | 0 | 2 | 8 | 16 |
|---|---|---|---|---|
| Tensile Strength at Break (MPa) | 0.9 | 16.9 | 20.2 | 20.3 |

Additional film samples were annealed at reduced temperatures. Results are contained in Table IB.

TABLE IB

Strength as a Function of Annealing Temperature-Time

| Temp. (°C.) | 40 | 40 | 50 | 50 | 60 | 60 | 70 | 70 |
|---|---|---|---|---|---|---|---|---|
| Time (min.) | 4 | 16 | 4 | 16 | 4 | 16 | 4 | 16 |
| Tensile Strength at Break (MPa) | 1.9 | 3.7 | 4.1 | 9.9 | 7.8 | 18.1 | 17.2 | 18.8 |

As may be seen by reference to the results of Tables IA and IB, films having good tensile strength properties, as indicated by tensile strength at break values, can be formed according to the present invention without the use of additives such as additional copolymer latices or aliphatic solvents even at relatively low annealing temperatures front 40° C. to 80° C.

Comparative A

Films of Block Copolymer Having Relatively Long Polystyrene Endblock Length

A dispersion was made from a styrene-isoprene-styrene block copolymer having $M_w$ of 205,000 Daltons and having a styrene content of 15 weight percent and 13 volume percent. The polystyrene endblocks had molecular weights of 15,300 Daltons. The polyisoprene centerblock molecular weight was 174,000 Daltons. The dispersion used in making the films had a solids content of 54 weight percent. The films were annealed at 80° C. for the times identified in Table II. Film formation and testing were according to the techniques of Example 1. Results are contained in Table II.

TABLE II

Strength as a Function of Annealing Time

| Minutes | 0 | 16 | 60 | 120 | 240 |
|---|---|---|---|---|---|
| Tensile Strength at Break (MPa) | 0.2 | 1.6 | 5.4 | 8.5 | 9.4 |

Compared to the results of Table I, it may be seen that block copolymers having a longer endblock vinyl aromatic polymer length require longer annealing times and/or higher annealing temperatures to achieve maximum tensile strengths.

Comparative B

Films of Block Copolymer Having Relatively Short Endblock Length

A dispersion of a styrene-isoprene-styrene block copolymer was prepared as in Example 1. The triblock copolymer had a $M_w$ of 85,000 Daltons and had a styrene content of 16 weight percent and 15 volume percent. The polystyrene endblock molecular weight was 6800 Daltons. The polyisoprene block molecular weight was 71,000 Daltons. Film samples were prepared by deposition onto glass and annealed at 80° C., as in Example 1. Results are contained in Table III.

TABLE III

| Strength as a Function of Annealing Time | | | | |
|---|---|---|---|---|
| Minutes | 0 | 4 | 16 | 120 |
| Tensile Strength at Break (MPa) | 1.4 | 5.0 | 6.7 | 7.5 |

By comparison with the results of Table I, it may be seen that a relatively short endblock vinyl aromatic polymer length gives block copolymers having rapid annealing times, but tensile strength properties may be reduced. By controlling the length of the monovinylidene aromatic block, it is possible to maximize the tensile strength of the block copolymer and minimize the annealing time and temperature requirements.

EXAMPLE 2

Films of Radial Block Copolymer

A dispersion of a four-armed styrene-isoprene block copolymer coupled with silicon tetrachloride was prepared as in Example 1. The polymer had an apparent molecular weight by gel permeation chromatography (GPC) of 227,000 Daltons. The styrene content was 15 weight percent, 13.2 volume percent. The polystyrene endblock weight average molecular weight was 11,300 Daltons. The polyisoprene radial block apparent weight average molecular weight was 182,000 Daltons. Film samples were prepared by deposition onto glass and annealed and tested as in Example 1. Results are combined in Table IV.

TABLE IV

| Strength as a Function of Annealing Time | | | | |
|---|---|---|---|---|
| Minutes | 0 | 4 | 16 | 60 |
| Tensile Strength at Break (MPa) | 1.4 | 14.9 | 19.1 | 21.0 |

EXAMPLE 3

Films of a Tapered Block Copolymer

Films of a symmetrically tapered styrene-isoprene-styrene block copolymer containing 26 weight percent styrene, an overall molecular weight ($M_w$) of 228,000 Daltons, a measured isolated styrene of 52 percent and effective phase volume styrene content of approximately 11 percent were prepared as in Example 1. The polystyrene endblock molecular weight was measured by degradation analysis and GPC to be 9700 Daltons. Films were cast on glass slides, dried at room temperature and annealed as in Example 1. Strength properties were tested according to ASTM-D-412 after annealing at 80° C. and at various temperatures. Results are contained in Tables VA and VB.

TABLE VA

| Strength as a Function of Annealing Time | | | | |
|---|---|---|---|---|
| Minutes | 0 | 4 | 16 | 30 |
| Tensile Strength at Break (MPa) | 0.5 | 4.8 | 11.8 | 13.1 |

TABLE VB

| Strength as a Function of Annealing Temperature-Time | | | | | | | | |
|---|---|---|---|---|---|---|---|---|
| Temp. (°C.) | 60 | 60 | 70 | 70 | 80 | 80 | 90 | 90 |
| Time (min.) | 4 | 30 | 4 | 30 | 4 | 30 | 4 | 30 |
| Tensile Strength at Break (MPa) | 1.1 | 2.9 | 2.0 | 5.3 | 4.8 | 13.1 | 10.6 | 18.1 |

Comparative C

Films of a Triblock Copolymer Having High Polystyrene Volume Percent

Dispersions were prepared from a toluene solution of a styrene-butadiene-styrene triblock copolymer. The polymer weight average molecular weight was approximately 100,000 Daltons. The polystyrene content was 30 weight percent, 29 volume percent. The polystyrene endblock molecular weight was 15,000 Daltons. The polybutadiene block molecular weight was 70,000 Daltons. When cast onto a clean glass plate according to Example 1, severe crackling of the film occurred. No coherent film could be formed at room temperature.

Comparative D

A dispersion was prepared from a cyclohexane solution of Kraton™ 1111 styrene-isoprene-styrene block copolymer containing nominally 22.7 percent styrene having a molecular weight of 147,000 Daltons and styrene endblock molecular weight of 16,700 Daltons. The film was annealed at 80° C. for various times and the results are compiled in Table VI.

TABLE VI

| Time at 80° C. (min.) | 0 | 4 | 16 | 60 |
|---|---|---|---|---|
| TS at Break (MPa) | 0.35 | 1.90 | 4.96 | 11.6 |

EXAMPLE 4

To a cyclohexane solution of the block copolymer described in Comparative C was added 44 percent by weight based on the block copolymer of an aliphatic mineral oil. This blend was dispersed in water as described in Example 1 and the cyclohexane was removed by distillation. The styrene phase volume in the organic phase was calculated to be 19 percent based on the assumption that all of the mineral oil is contained in the butadiene phase. The dispersion was cast on a clean glass plate which, upon drying, left a coherent film. The film was annealed in a forced-air oven at 80° C. Samples were tested for tensile strength after varied annealing times. The results are compiled in Table VII.

TABLE VII

| Time at 80° C. (min.) | 4 | 16 | 30 | 60 |
|---|---|---|---|---|
| Tensile Strength (MPa) | 1.7 | 10.1 | 11.6 | 11.7 |

EXAMPLE 5

A dispersion was made from a cyclohexane solution containing 35 percent by weight of a styrene-isoprene-styrene block copolymer containing 18 percent by weight polystyrene (15.9 volume percent) with the structure polystyrene-polyisoprene-polystyrene being 10,000-110,000-10,000. This solution was dispersed into water using Alipal™ CO-436 surfactant at a level of 3.0 percent by weight based on polymer solids. After the dispersion was formed, the solvent was removed under vacuum to give a dispersion that was 59 percent by weight solids. Films were cast onto glass plates in two layers and dried 2–16 hours at room temperature to provide a dried film thickness of approximately 0.25 mm. These films were cut into samples, annealed at 80° C. for various times and tested according to ASTM-D-412. The results are compiled in Table VIII.

TABLE VIII

| Annealing Time at 80° C. (min.) | 0 | 2 | 8 | 16 |
|---|---|---|---|---|
| TS at break (MPa) | .57 | 3.23 | 11.5 | 13.5 |

EXAMPLE 6

A dispersion of styrene-isoprene-styrene block copolymers was prepared as in Example 1. Polymer A was 14 weight percent styrene (12.4 volume percent styrene) with a structure polystyrene-polyisoprene-polystyrene of 9500-109,000-9500. Polymer B was 15 weight percent styrene (13.2 volume percent styrene) with a structure polystyrene-polyisoprene-polystyrene of 15,300-154,400-15,300. Film samples were prepared on glass and annealed as described in Example 1. The results are compiled in Table IXA.

TABLE IXA

| Annealing Time at 80° C. (min.) | 0 | 2 | 8 | 16 |
|---|---|---|---|---|
| Sample A | .90 | 16.9 | 20.2 | 20.3 |
| Sample B | .21 | — | .81 | 1.55 |

Sample A was annealed at temperatures below 70° C. Strength after 4 and 16 minutes was noted. The results are compiled in Table IXB.

TABLE IXB

| Temperature (°C.) | 70 | 60 | 55 | 50 | 40 |
|---|---|---|---|---|---|
| Strength 4 min. | 17.2 | 7.8 | 6.9 | 4.1 | 11.86 |
| Strength 16 min. | 18.8 | 18.1 | 19.9 | 9.9 | 3.7 |

EXAMPLE 7

A dispersion was prepared from a cyclohexane solution of a styrene-butadiene-styrene triblock copolymer containing 17 weight percent styrene having a molecular weight of 145,000 Daltons. This corresponds to 16.5 volume percent styrene. The molecular weight of the polystyrene endblocks was 12,300 Daltons. After drying at room temperature, samples of the film were annealed in a forced-air oven at 80° C. for various times. The results are compiled in Table X.

TABLE X

| Time at 80° C. (min.) | 4 | 16 | 60 | 300 |
|---|---|---|---|---|
| Strength (MPa) | 3.4 | 11.7 | 12.0 | 21.2 |

EXAMPLE 8

Dispersions were prepared from both toluene and cyclohexane solutions of a styrene-isoprene-styrene triblock copolymer containing 15 weight percent styrene. This corresponds to 13.2 volume percent styrene. After drying at room temperature, samples were annealed in a forced-air oven at 80° C. for various times. This shows that either aliphatic or aromatic solvents may be used to prepare dispersions which anneal to high strengths. The results are compiled in Table XI.

TABLE XI

| Time at 80° C. | 2 | 8 | 30 | 60 |
|---|---|---|---|---|
| Toluene | 12.9 | 18.3 | 20.5 | 21.1 |
| Cyclohexane | 8.0 | 13.2 | 17.9 | 19.9 |

EXAMPLE 9

A styrene-butadiene-styrene triblock copolymer (SBS) was dissolved into cyclohexane to produce a 16 percent by weight solids solution. The molecular composition of the SBS polymer was 18.4 percent styrene and 84,000 peak molecular weight. This SBS stock solution was emulsified using a Silverson Model L4R high shear mixer, batchwise. The batch composition is 2750 grams of polymer solution (440 grams of polymer), 23.2 grams of surfactant (dioctylsulfosuccinic acid sodium salt) and 1294 grams of water. The three components are mixed at maximum rpm (nominally 5000 rpm) for 5 minutes. During the mixing step, 0.6 ml of a defoamer is added to prevent excessive foaming. Solvent removal is accomplished by vacuum devolatilization in a rotating glass apparatus with a bath temperature of 90° C. The finished sample, after filtering, was analyzed at 25.4 percent solids and was added to an agitated tank. The agitation was sufficient to mix the solution but does not introduce any air bubbles into the sample. A glass mold at 90° C. with a slightly roughened surface was dipped into a calcium nitrate and methanol solution (nominally 10 percent solids) and allowed to cool to room temperature. The mold was dipped into the sample with a dwell time of 5 seconds and removed and placed for a minimum of 5 minutes into a water tank which was maintained at 40° C. The wet film was dried and annealed in a forced-air oven at 90° C. for 20 minutes and then removed and tested. The film was free of any holes and possessed a tensile strength of greater than 3000 psi tensile.

EXAMPLE 10

A styrene-isoprene-styrene (SIS) triblock copolymer was dissolved into cyclohexane to form a 16 percent by weight solids solution. This solution was emulsified using a Silverson Model L4R high shear mixer. The batch consists of 800 grams of SIS stock solution 128 grams polymer, 512 grams of water and 6.8 grams of a surfactant and dioctylsulfosuccinic acid sodium salt. The mixture was mixed at 5000 rpm for 5 minutes. During the mixing step 0.3 ml of a defoamer is added to prevent excessive foaming. Solvent removal is accomplished by vacuum devolatilization in a rotating glass apparatus with a bath temperature of 90° C. The finished dispersion after filtration having a solids level of 27 percent by weight was added to an agitated tank. Agitation was sufficient to mix the dispersion but not to introduce air bubbles to the mixture. A glass mold at 90° C. having a lightly roughened surface was dipped into a calcium nitrate and methanol solution (about 10 percent by weight solids) and allowed to cool to room temperature. The mold was dipped into the dispersion for about 5 seconds and removed. The coated mold was placed in a water tank at 40° C. for about 5 minutes. The wet film was dried and annealed in a forced-air oven at 90° C. for 20 minutes and then removed and tested. The film was free of any holes and possessed a tensile strength of greater than 3000 psi (20.7 MPa).

EXAMPLES 11–16

Dispersions were prepared using the process described in Example 10 with the exception that different surfactants were used. The surfactants were sodium salt of abietic acid, potassium salt of abietic acid, sodium salt of oleic acid, potassium salt of oleic acid, sodium salt of 2-ethylhexyl sulfosuccinic acid and sodium salt of dioctylsulfosuccinic acid. The resulting films were tested for dispersion stability, ability to coagulate, wet gel strength and examined for film uniformity and tensile strengths after annealing. All of the films passed the tests and demonstrated tensile strengths of greater than 20.7 MPa (3000 psi) after annealing for 30 minutes at 80° C.

EXAMPLE 17

188 Grams of triblock styrene-isoprene-styrene having 18 percent by weight styrene and a peak average molecular weight of 125,000 Daltons, available from Dexco Polymers under the trademark and designation VECTOR™ 4111, 584 grams of cyclohexane, 5.8 grams of a sodium salt solution of oleic acid, 3.8 grams of N,N'-di-2-octyl paraphenylenediamine available from R. L. Vanderbilt under the trade name and designation ANTOZITE™ 1, 3.8 grams of CP HALL™ 1230 paraffin wax (MP 3501 wax) and 0.8 grams of butyl hydroxy toluene (BHT) were blended together. The blend was contacted with 368 grams of water in a high shear mixer and mixed at 5000 rpm for 10 minutes. The dispersion was transferred to a heated rotating glass bulb to remove the solvent to give a dispersion of 42 percent by weight solids. Films of the dispersion were prepared by coagulation as described in Example 10. The films had thicknesses of about 7 mils (0.18 mm). Specimens were cut from the films using a 2.5 in. ×0.5 in. (6.4×1.3 cm) ASTM "L" tensile die. The thin portion of the specimens were stretched to 100 percent elongation and secured in place to a stiff white fiberboard. The samples were exposed to ambient ozone levels (between 1 and 5 parts per hundred million (ppm)). Time to break was recorded to within 24 hours. The films were reddish-brown in color, were nonstaining and exhibited an ozone resistance of greater than 1000 hours.

EXAMPLE 18

Example 17 was repeated except the antiozonant used was bis-(1,2,3,6-tetrahydrobenzaldehyde)-pentaerythrityl acetal in an amount of 5.0 grams (3.0 parts per hundred parts of resin (phr)). The film was nonstaining and exhibited an ozone resistance of greater than 1000 hours.

EXAMPLE 19

Example 17 was repeated, except the antiozonant used was a bis-(alphamethylbenzyl)phenol available from PMC Specialties Group under the trade name and designation PRODOX™ 120 in an amount of 5.0 grams (3.0 phr). The film was white and nonstaining and exhibited an ozone resistance of greater than 1000 hours.

What is claimed is:

1. A process for preparing a film which comprises:
   (1) forming an aqueous dispersion which comprises:
   I. an organic phase comprising one or more block copolymer(s) corresponding to the formula:

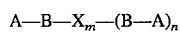

$$A\text{—}B\text{—}X_m\text{—}(B\text{—}A)_n$$

wherein each A is a polymer block consisting essentially of a monovinylidene aromatic monomer, each B is a polymer block consisting essentially of a conjugated diene and, optionally, a monovinylidene aromatic monomer, X is the remnant of a multifunctional coupling agent, m is 0 or 1, and n is an integer from 1 to 5, each monovinylidene aromatic monomer block having a weight average molecular weight from about 8,000 to about 15,000 Daltons, each conjugated diene block having a weight average molecular weight from about 30,000 to about 200,000 Daltons, II. a surfactant in sufficient amount to emulsify the organic phase in water and such that a film formed from the dispersion exhibits the required properties, and III. water, wherein the effective phase volume of the A block in the organic phase is from about 5 to about 20 percent (2) depositing a coating of the aqueous dispersion on a surface and drying the coating to form a film;
   (3) removing the film from the surface; and
   (4) annealing the film at about 30° C. to about 120° C. for about 1 to about 60 minutes such that the film exhibits a tensile strength at break of 11.0 MPa or greater.

2. A process according to claim 1 wherein the surfactant is present in an amount of from 0.5 to 10 percent by weight.

3. A process according to claim 2 wherein the organic phase further comprises an antiozonant.

4. A process according to claim 3 wherein the antiozonant is selected from the group of dialkyl paraphenylenediamines, acetals and styrene-substituted phenols.

5. A process according to claim 4 wherein the antiozonant is selected from the group of acetals and styrene-substituted phenols.

6. A process according to claim 4 wherein the antiozonant is selected from the group of N,N'-di-2-octyl paraphenylenediamine, bis-(1,2,3,6-tetrahydrobenzaldehyde)-pentaerythrityl acetal and bis-(alphamethylbenzyl)phenol.

7. A process according to claim 4 wherein the organic phase comprises from about 0.5 to about 5 percent by weight of antiozonant based on the solids in the dispersion.

8. A process according to claim 4 wherein the organic phase comprises from about 3 to about 5 percent by weight of antiozonant based on the solids in the dispersion.

9. A process according to claim 4 wherein the surfactant is selected from salts of $C_{8\text{-}17}$ carboxylic acids having branching or cycloaliphatic moieties and unsaturation in the carbon chain, $C_{18-30}$ carboxylic acids having in its carbon chain one or more of cycloaliphatic moieties, unsaturation or branching and $C_{8-30}$ sulfosuccinic acids having one or more of branching and unsaturation in the carbon chain.

10. A process according to claim 9 wherein the surface is coated with a divalent ion solution and thereafter contacted with the dispersion to form a film of the dispersion on the surface by coagulation.

11. A free-standing film prepared according to the process of claim 10 wherein the film is annealed and exhibits a tensile strength at break of about 11.0 MPa or greater.

12. A process according to claim 10 wherein the surfactant is selected from the group of salts of $C_{18-30}$ carboxylic acids having in its carbon chain one or more of unsaturation, branching or one or more cycloaliphatic moieties and $C_{8-30}$ sulfosuccinic acids having on its carbon chain one for more of branching or unsaturation.

13. A process according to claim 10 wherein the surfactant is selected from the group of salts of oleic acid, abietic acid, isostearic acid, octadecanoic sulfosuccinic acid, ethylhexyl sulfosuccinic acid and salts thereof.

14. A free-standing film prepared according to the process of claim 1 wherein the film is annealed and exhibits a tensile strength at break of about 11.0 MPa or greater.

15. The process of claim 1 wherein the organic phase further comprises an extender.

16. A film prepared according to the process of claim 15 wherein the organic phase further comprises an extender comprising a hydrocarbon oil or a polymer compatible with the B block of the copolymer.

17. A film according to claim 14 wherein the organic phase comprises two or more block copolymers and a residue of the surfactant wherein the average A block content of the two or more block copolymers is from about 5 to about 25 percent by weight and wherein the monovinylidene aromatic monomer block of each of the two or more block copolymers has a weight average molecular weight of from about 8,000 to about 15,000 Daltons.

18. A coherent, elastomeric, solid, free-standing film comprising an organic phase comprising one or more block copolymer(s) corresponding to the formula:

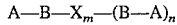

wherein each A is a polymer block consisting essentially of a monovinylidene aromatic monomer, each B is a polymer block consisting essentially of a conjugated diene and, optionally, a monovinylidene aromatic monomer, X is the remnant of a multifunctional coupling agent, m is 0 or 1, and n is an integer from 1 to 5, each monovinylidene aromatic monomer block having a weight average molecular weight from about 8,000 to about 15,000 Daltons, each conjugated diene block having a weight average molecular weight from about 30,000 to about 200,000 Daltons, wherein the A block exhibits an effective phase volume in the organic phase from about 5 to about 20 percent, wherein the film is annealed and demonstrates a tensile strength of 11.0 MPa or greater.

19. A film according to claim 18 wherein the organic phase further comprises an antiozonant.

20. A film according to claim 19 wherein the antiozonant is selected from the group of dialkyl paraphenylenediamines, acetals and styrene-substituted phenols wherein the film is non-staining and demonstrates ozone resistance for at least 1000 hours.

21. A film according to claim 19 wherein the antiozonant is selected from the group of acetals and styrene-substituted phenols.

22. A film according to claim 19 wherein the antiozonant is selected from the group of N,N'-di-2-octyl paraphenylenediamine bis-(1,2,3,6-tetrahydrobenzaldehyde)-pentaerythrityl acetal and bis-(alphamethylbenzyl)phenol.

23. A film according to claim 19 wherein the organic phase comprises from about 0.5 to about 5 percent by weight of antiozonant based on the film.

24. A film according to claim 19 wherein the organic phase comprises from about 3 to about 5 percent by weight of antiozonant based on the film.

25. A film according to claim 18 wherein the organic phase further comprises an extender comprising a hydrocarbon oil or a polymer compatible with the B block of the copolymer.

26. A film according to claim 18 wherein the organic phase comprises two or more block copolymers and the residue of a surfactant wherein the average A block content of the two or more block copolymers is from about 5 to about 25 percent by weight and wherein the monovinylidene aromatic monomer block of each of the two or more block copolymers has a weight average molecular weight of from about 8,000 to about 15,000 Daltons.

27. A film according to claim 18 wherein the monovinylidene aromatic monomer is styrene and the conjugated diene is 1,3-butadiene or isoprene.

28. A film according to claim 16 wherein the effective phase volume of the monovinylidene aromatic polymer blocks is from about 10 to about 19 percent.

29. A film according to claim 16 wherein the monovinylidene aromatic monomer is styrene and the conjugated diene is 1,3-butadiene or isoprene.

30. A film according to claim 18 wherein the effective phase volume of the monovinylidene aromatic polymer blocks is from about 10 to about 19 percent.

* * * * *